United States Patent
Das et al.

(10) Patent No.: US 7,420,962 B2
(45) Date of Patent: Sep. 2, 2008

(54) METHOD FOR MANAGEMENT OF VOICE-OVER IP COMMUNICATIONS OF VARIOUS RELATIVE PRIORITY LEVELS

(75) Inventors: Kamala Prasad Das, Manalapan, NJ (US); David J. Houck, Colts Neck, NJ (US); Om Prakash Mahajan, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 857 days.

(21) Appl. No.: 10/674,123

(22) Filed: Sep. 26, 2003

(65) Prior Publication Data

US 2005/0070230 A1 Mar. 31, 2005

(51) Int. Cl.
*H04L 12/66* (2006.01)
(52) U.S. Cl. .......... 370/352; 370/392; 370/396
(58) Field of Classification Search .......... 370/449, 370/351, 352, 396, 392; 709/223
See application file for complete search history.

(56) References Cited

U.S. PATENT DOCUMENTS

| | | | |
|---|---|---|---|
| 6,324,166 B1 * | 11/2001 | Yokoyama et al. | 370/234 |
| 6,539,483 B1 * | 3/2003 | Harrison et al. | 726/1 |
| 6,578,076 B1 * | 6/2003 | Putzolu | 709/223 |
| 6,636,585 B2 * | 10/2003 | Salzberg et al. | 379/22 |
| 6,778,496 B1 * | 8/2004 | Meempat et al. | 370/230 |
| 6,977,933 B2 * | 12/2005 | Soncodi et al. | 370/392 |
| 7,023,979 B1 * | 4/2006 | Wu et al. | 379/265.11 |
| 7,027,410 B2 * | 4/2006 | Zavalkovsky et al. | 370/252 |
| 7,046,680 B1 * | 5/2006 | McDysan et al. | 370/396 |
| 7,054,308 B1 * | 5/2006 | Conway | 370/356 |
| 7,088,677 B1 * | 8/2006 | Burst, Jr. | 370/229 |
| 7,130,273 B2 * | 10/2006 | Baj | 370/242 |
| 7,154,851 B1 * | 12/2006 | Fedyk et al. | 370/230 |
| 7,173,910 B2 * | 2/2007 | Goodman | 370/252 |
| 7,287,070 B2 * | 10/2007 | Shaheen et al. | 709/223 |
| 2002/0089985 A1 * | 7/2002 | Wahl et al. | 370/395.1 |
| 2003/0103525 A1 * | 6/2003 | Wahl | 370/465 |
| 2003/0187986 A1 * | 10/2003 | Sundqvist et al. | 709/225 |
| 2003/0202507 A1 * | 10/2003 | Nishida et al. | 370/352 |

(Continued)

FOREIGN PATENT DOCUMENTS

EP 1347603 A1 * 9/2003

(Continued)

OTHER PUBLICATIONS

Bernet, et al., "A Framework for Integrated Services Operation over Diffserv Networks", RFC 2998, Nov. 2000.

(Continued)

*Primary Examiner*—Thong H Vu

(57) ABSTRACT

A method for managing calls of various relative priority levels in an IP network includes polling at least one location in the network to obtain information indicative of a level of utilization said at least one location and computing a status of utilization of said at least one location based on said polled information and assigning a decision policy to said status. A priority level of a new voice call requesting to enter the network is then assessed against relative to priorities of existing calls on the network and the decision policy is invoked on the new voice call according to its relative priority level to the existing calls on the network and the decision policy in effect at the time the new voice call requests entry to the network.

21 Claims, 7 Drawing Sheets

U.S. PATENT DOCUMENTS

2006/0067298 A1* 3/2006 Houck et al. ............... 370/352
2006/0133345 A1* 6/2006 Benco et al. ............... 370/352

OTHER PUBLICATIONS

Davie, et al., "An Expedited Forwarding PHB (Per-Hop Behavior)", RFC 3246, Mar. 2002.
Grossman, "New Termination and Clarifications for Diffserv", RFC 3260, Apr. 2002.
Heinanen, "Assured Forwarding PHB Group", RFC 2597, Jun. 1999.
Jacobson et al., "An Expedited Forwarding PHB", RFC 2598, Jun. 1999.
Houck and Meempat, "Call Admission Control and Load Balancing for Voice Over IP", Performance Evaluation, 243-253, 2002.
Houck et al., U.S. Appl. No. 10/657,864, filed Sep. 9, 2003.

* cited by examiner

METHOD FOR MANAGEMENT OF VOICE-OVER IP COMMUNICATIONS OF VARIOUS RELATIVE PRIORITY LEVELS

FIELD OF THE INVENTION

The invention relates to the field of communications systems and more specifically to the Quality of Service (QoS) management and admission control for voice calls of varied classifications or prioritizations in a voice-over IP (VoIP) network.

DESCRIPTION OF THE BACKGROUND ART

Telecommunications networks and other networks are increasing in both size and complexity in order to serve the growing demand for high speed communication links for the transfer of voice and/or data information. As these telecommunication networks approach capacity, alternate solutions or networks are sought to meet the demand for increasing network bandwidth.

Traditionally, voice calls are transported entirely over the end-to-end, circuit-based Public Switched Telephone Network (PSTN). However, considerable attention has been directed toward the implementation of real-time communication across computer data networks, and particularly the ability to route voice traffic over these networks. Interest has also been raised in using Voice over IP (VoIP) solutions to facilitate voice communication between originating and terminating PSTN end points and enterprise or private network end points served by PSTN Switches, Private Branch Exchanges (PBX), or IP end points in Local Area Networks (LAN) via the Internet or private IP network. Using a private IP network or Internet for long haul routing substantially bypasses the PSTN.

For PSTN bypassing applications, pulse code modulated (PCM) voice traffic is processed into IP (or ATM) packets, transported over the private IP network or Internet (or ATM network), and then processed back to PCM voice. To facilitate such call routing, originating and terminating End Office (EO) switches can be connected to PSTN/IP (or PSTN/ATM) gateways that reside as hosts on the IP (or ATM) network. Based on the called number or other signaling indicator, the EO switches route certain calls through the IP (or ATM) gateways instead of the PSTN.

Unfortunately, when a new VoIP telephone voice call is established (with the intent of it being routed over the IP network), there are no means to evaluate the level of congestion of the core IP network. In other words, it is possible to have too many new voice calls being introduced to the network at the same time so that the core IP network is overloaded. Under such a condition, it is highly likely that packets of information that contain the voice data will either be dropped, lost, or delayed from arriving at the destination. These conditions result in poor Quality of Service (QoS) of the network.

The problem of QoS is further compounded when the communication network must handle voice calls of different priority levels or classifications, which exist, for example, in a Defense Switched Network (DSN). That is, there is a need to provide a differentiation in quality based on the priority level of the call as well as provide quality to all calls in the system. The highest priority calls, for instance, must not be blocked, and receive the best voice quality, even during traffic overloads and IP network congestion. These types of conditions can arise during crisis or partial network failures. Existing architecture does not have the flexibility to automatically adapt to these changing conditions. Instead, existing architecture drops established calls (of lower precedence) to free up resources in the network. This method is disruptive and not user-friendly.

SUMMARY OF THE INVENTION

The disadvantages heretofore associated with the prior art are overcome by a novel method for managing voice call traffic of various relative priority levels. The method includes the steps of polling at least one location in a network to obtain information indicative of a level of utilization said at least one location, computing a status of utilization of said at least one location based on said polled information and assigning a decision policy to said status, assessing a priority level of a new voice call requesting to enter the network relative to priorities of existing calls on the network and invoking said decision policy on the new voice call according to its relative priority level to the exising calls on the network and the decision policy in effect at the time the new voice call requests entry to the network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The subject invention establishes and manages VoIP traffic of different priority levels in a network (for example an Internet Protocol (IP) network) by monitoring criteria indicative of importance of a new voice call entering the network, network capability and/or instantaneous load. Accordingly, an exemplary telecommunications system is described as one potential environment in which a subject invention operates and exists.

Figure 1:
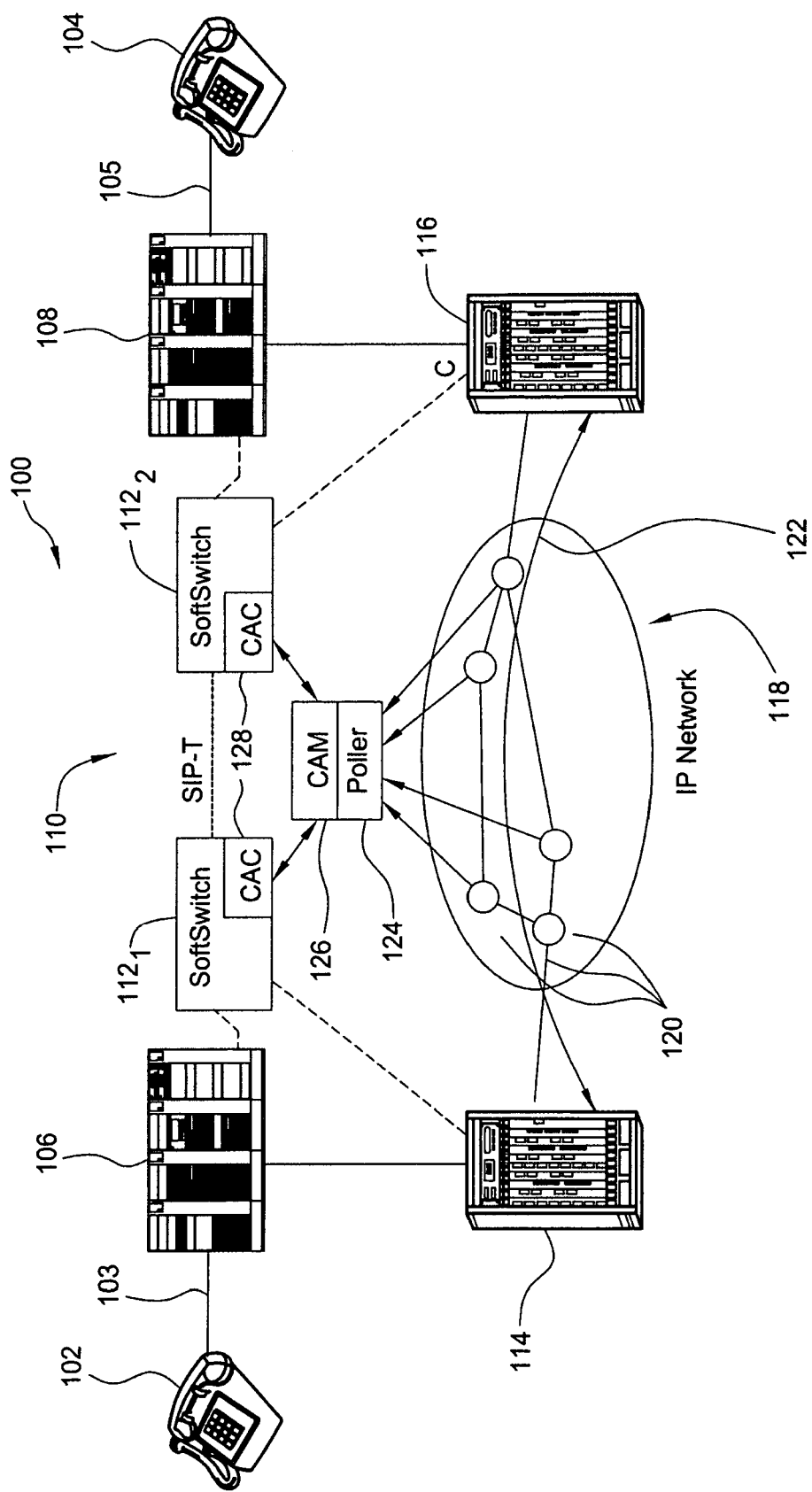
FIG. 1 depicts a general overview of a first type of communication network that employs the subject invention.

FIG. 1 depicts an exemplary telecommunications system 100 for routing telephone calls between at least a first wire line subscriber 102 and at least a second wire line subscriber 104 in a PSTN 110. Such telephone calls are routed across an intermediate data network 118 implementing a network layer protocol, such as IP (or a link layer protocol such as asynchronous transfer mode (ATM) or both). The telecommunications system 100 includes a first subscriber end office unit 106 connected to the first subscriber 102 and a second end office 108 connected to the second subscriber 104. Interconnection of these components is achieved via conventional local loop subscriber lines (103 and 105 respectively). For example, such first subscriber line 103 and second subscriber line 105 would typically be implemented using two-element twisted pair wires carrying analog information or basic rate ISDN digital information.

In one embodiment, it is possible to bypass the PSTN 110 using the data network 118. Such alternate communication path is established by connecting the first end office 106 to a first gateway 114 and likewise connecting and connecting the second end office unit 108 to a second gateway 116. First and second gateways 114 and 116 respectively reside as hosts on the network 118. They provide VoIP services on behalf of the first wire line subscriber 102 and second wire line subscriber 104 and other users (not shown) communicating over the network 118. During VoIP communications between the first wire line subscriber 102 and the second wire line subscriber 104, PCM traffic is routed from the first end office 106 and second end office 108 to the respective gateways 114 and 116 for routing across the data network 118. A first softswitch $112_1$ is connected to the first subscriber end office unit 106 and first gateway 114. A second softswitch $112_2$ is connected to the second subscriber end office unit 108 and second gateway 116. The softswitches 112 coordinate with their respectively connected gateways to synchronize the signals requested to start data transfer from the gateways to the network 118. A Poller 124 is connected to various points in the network 118 and to the softswitches 112. Within the Poller 124 is a Call Admission Manager (CAM) 126. Within each softswitch 112 is a Call Admission Controller (CAC) 128. Depending on the implementation, the CAC 128 can be a standalone or may be implemented within the gateways 114 and 116, as well. The CAC's 128 and CAM 126 each execute specific and dedicated algorithms in order to monitor the status of links in the network 118 and admit new voices to the network accordingly. The details of CAC and CAM algorithms are described in David Houck and Gopal Meempat, "Call admission control and load balancing for voice over IP", Performance Evaluation Vol. 47, No. 4, March, 2002, Pages: 243-253 herein incorporated by reference.

Figure 4:
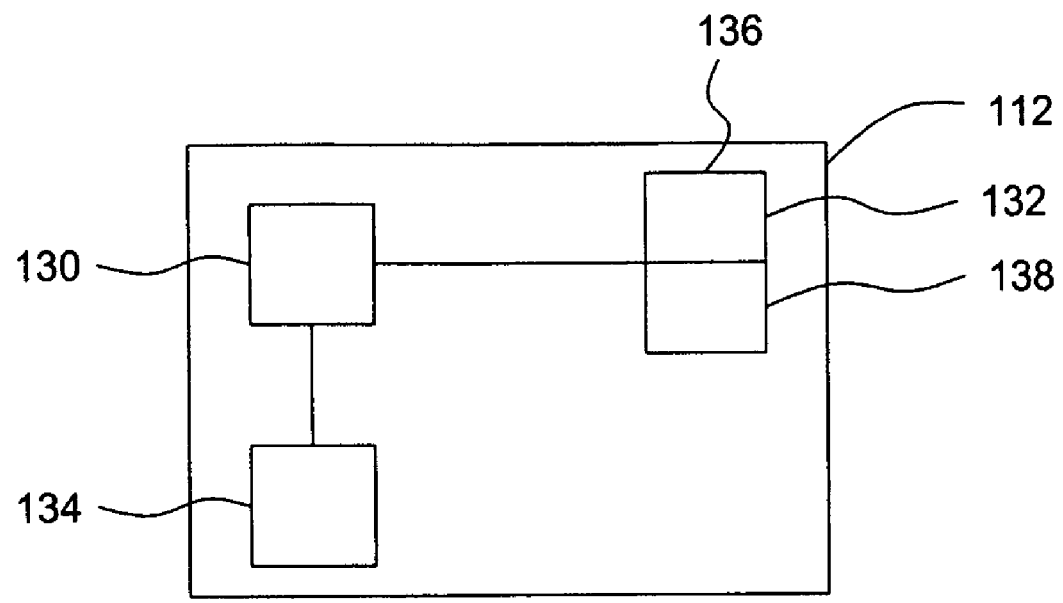
FIG. 4 depicts detailed view of call admission and call management modules associated with the subject invention.
Figure 4:
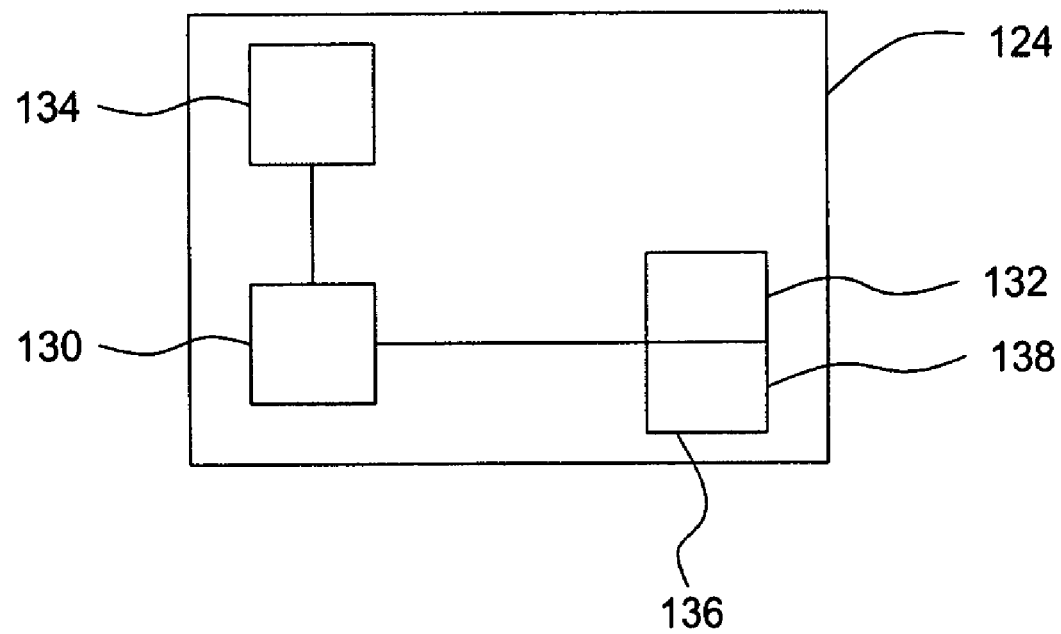

FIG. 4 details the internal circuitry of the softswitches 112 and poller 124. Specifically, the softswitches 112 and poller 124 each comprise at least one central processing unit (CPU) 130, support circuits 134, and memory 136. The CPU 130 may comprise one or more conventionally available microprocessors. The support circuits 134 are well known circuits that comprise power supplies, clocks, input/output interface circuitry and the like. Memory 136 may comprise random access memory, read only memory, removable disk memory, flash memory, and various combinations of these types of memory. The memory 136 is sometimes referred to as main memory and may in part be used as cache memory or buffer memory. The memory 136 stores various software packages that dictate call admission policies in the CAC 128 and CAM 126 modules respectively.

Figure 2:
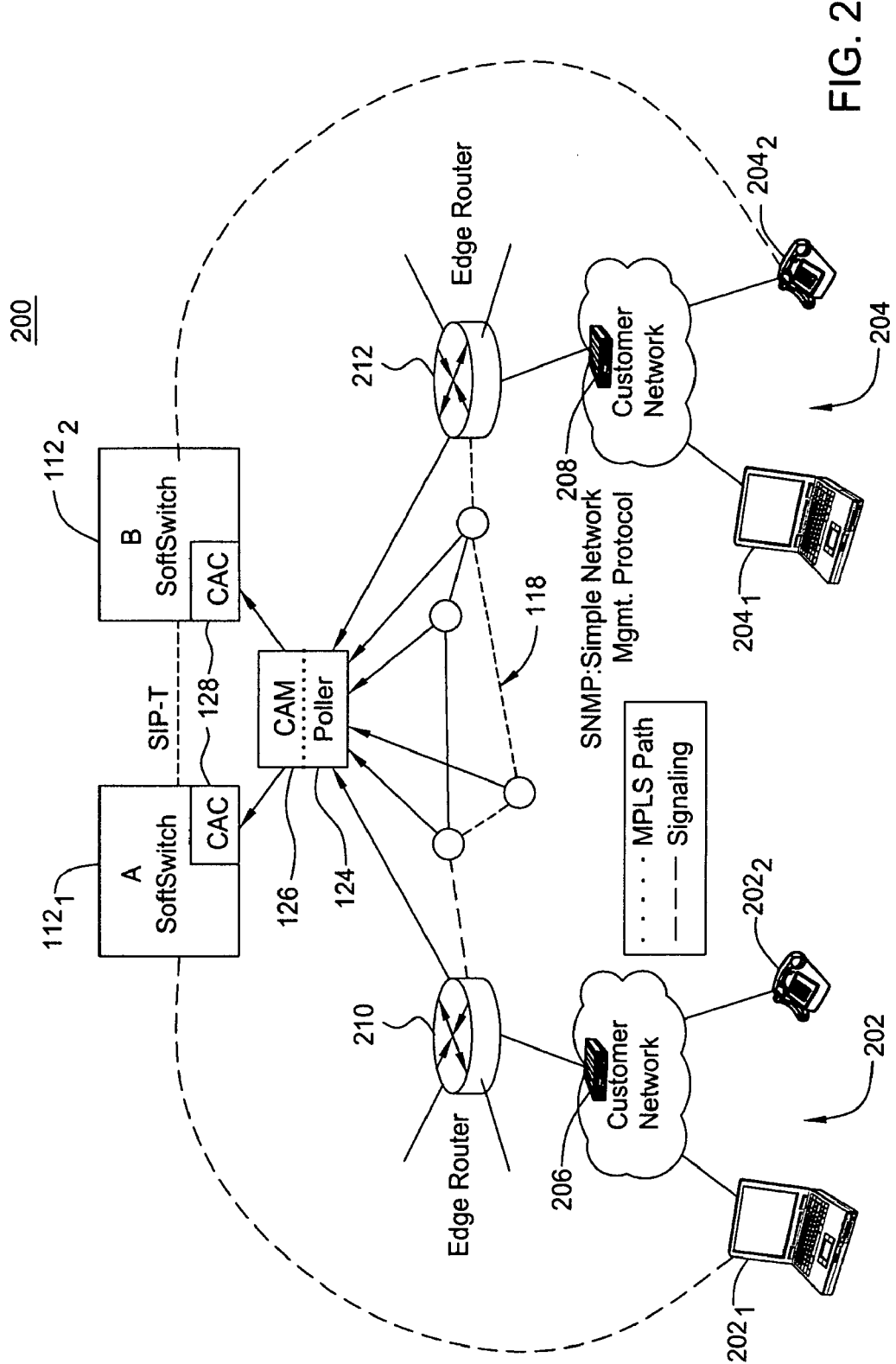
FIG. 2 depicts a general overview of a second type of communication network that employs the subject invention.

FIG. 2 depicts an exemplary end-to-end VoIP network system 200 (i.e., there are no PSTN components on the system). The end-to-end VoIP network system 200 has similarities to the PSTN based telecommunications system 100 and the specific distinctions are described below. Specifically, instead of first and second wire line subscribers 102 and 104, the end-to-end VoIP system 200 will contain first IP customer 202 and second IP customer 204. Each of said IP customers 202 and 204, respectively, will have one or more customer devices, which may be selected from the group consisting of an IP phone and IP soft client based component in a laptop or other wired or wireless communication device $202_n$ and $204_n$. Each of the IP customer devices are linked to the network 118 via a local first customer network route 206 and a second customer network router 208, respectively. Each of the customer network routers 206 and 208, respectively, are connected directly to the network 118 via first edge router 210 and second edge router 212, respectively. The first edge router 210 and second edge router 212 are logically connected to the Poller 124. And in similar fashion to the PSTN based communications network 100, softswitches 112 are logically connected to the Poller 124 as well as to subscriber components such as IP subscriber components 202 and 204.

In either communication system 100 or 200, a new voice call must be integrated into the network via a path and at a time where the congestion levels that exist in the network are sufficiently below system limits to allow the call and to allow it at a sufficient data rate to provide continuing quality of service for the new call as well as all existing calls in the network. The CAC 128 and CAM 126 are responsible for managing these tasks as described in the above-cited reference and also as discussed in co-pending Patent Application entitled "Method and Apparatus for Management of Voice Over IP Communications" authored by Houck et. al.

Figure 5:
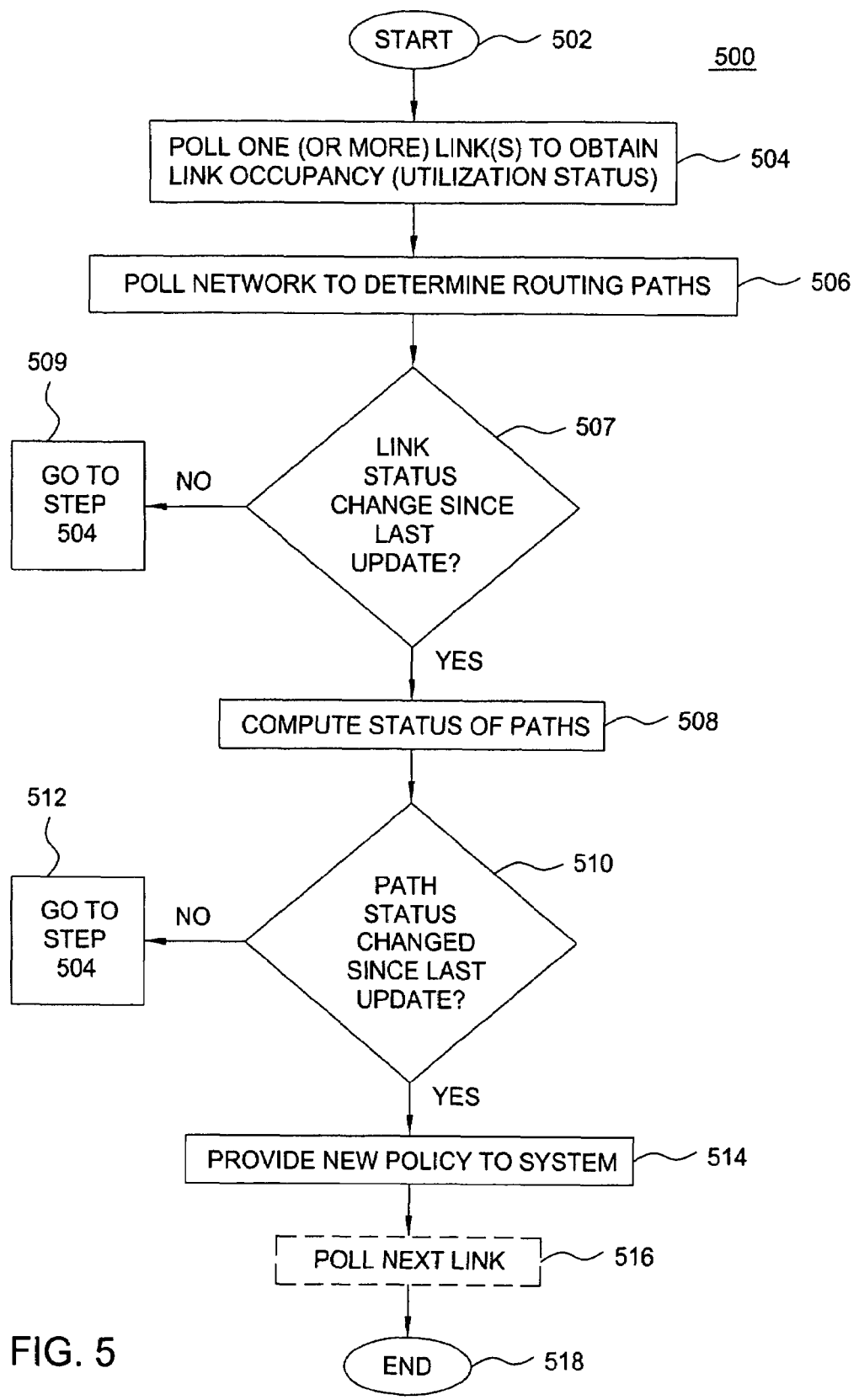
FIG. 5 depicts a series of method steps for determining and establishing call blocking/allowing in the network.

In greater detail and with specific regard to the subject invention, FIG. 5 depicts a series of method steps 500 that the CAM 126 follows to establish call policy and how the softswitches $112_1$ and $112_2$ handle calls. Specifically, the method 500 starts at step 502 and proceeds to step 504. At step 504, the CAM 126 polls various locations 120 in the network 118 for link occupancy periodically and collects link occupancy for voice for all links. In one embodiment, polling is performed approximately once every minute. The CAM 126 also polls, but on a less frequent basis, to discover the routing paths between a pair of gateways or edge routers at step 506. This can either be MPLS Label Switched Paths (LSP's) or via other routing protocols such as OSPF. Note that steps 504 and 506 are interchangeable with no effect on the overall invention. At step 507, a decision is made as to whether a status of the polled link(s) has changed since the last update cycle. If there has been no change in the status, the method goes to step 509 where polling begins again for a new update cycle as per step 504. If the status of link has changed, the polled information is processed and a status of each path in the network is computed in step 508. In one embodiment of the invention, the status of each path is defined by the worst case link on each path (i.e., path with the worst amount of packet congestion or utilization). This processing translates the path status into a decision policy for each pair of gateways or edge routers (depending on the system) for the current update cycle.

At step 510, the method enters a decision step where the status of paths for the current update cycle is compared to the previous status at a previous update cycle. If there is no change in the status, the method goes to step 504 where polling begins again for a new update cycle. If the there is a change in status, the method proceeds to step 514 where the status of all paths is updated to the current decision policy computed during the current update cycle (i.e., the new policy is provided to the softswitches controlling that particular path). Optionally, the method then proceeds to step 516 where next link in the network is polled. Such step occurs only if one link was polled in step 504. That is, if polling is conducted serially, step 516 is performed. If polling is conducted in parallel (all at the same time), step 516 is not necessary. The method ends at step 518.

The CAM 126, in effect, gathers information from the network routers through standard MIBs providing link and process utilizations that enables the call blocking policy (the throttling mechanism for the incoming calls based on the link utilization) in the CAC. Since the CAM 126 is a network function, it also enables changing the blocking policy variables via network management interfaces. The CAC 126 is distributed in the softswitches 112 or gateways 114, 116 where it is either integrated into the call processing logic or hosted on an adjunct processor or is standalone implemented on a server. A CAC database in a particular softswitch contains blocking policy only for a subset of LSP paths, the ones involving gateways/edge routers controlled by that softswitch 112$_n$. During call processing, the softswitch 112 looks into the CAC database to determine if the call is to be allowed or blocked. Alternately, the CAM 126 can send link status information (acquired in for example steps 504 and 506) and let the CAC 128 perform the policy decision that is best for the current update period.

There is no per-call interaction between the softswitch 112 and the CAM 126, or per-call computations. The logic of the CAC/CAM algorithms follows these three steps, executed in sequence, once every T seconds (referred to as the update interval):
1. Update the link utilization database in the CAM 124. This is accomplished by receiving traffic measurement reports for all IP routers, once every T seconds.
2. Compute the admission control and load balancing decisions to be used by the softswitches 112 until the next update epoch.
3. Disseminate the control decisions to the softswitches 112 where they are executed for each new call arrival, until the next update is received.

It should be noted that these controls can be computed and disseminated asynchronously. That is, the CAM can poll a link's status, and if changed, can immediately update the policy paths that use that link and send out a new policy to the softswitch. There is no need to wait to poll all the links first.

In addition, each new call entering the network is assigned a call-level and a packet-level priority based upon a priority scale. As this new call enters the communication system 100 or 200, said call is processed in such a manner as to evaluate its priority level and its destination to determine whether said call has priority over an existing call already at the destination. Based on said new call priority, the quality of said new call is also processed so that a higher priority call receives better quality of service than a call of lower priority already existing on the network. New originating calls of higher priority reaching a destination with an existing in-progress call of lower relative priority will also preempt said lower priority existing call by the following method described below.

Figure 3A:
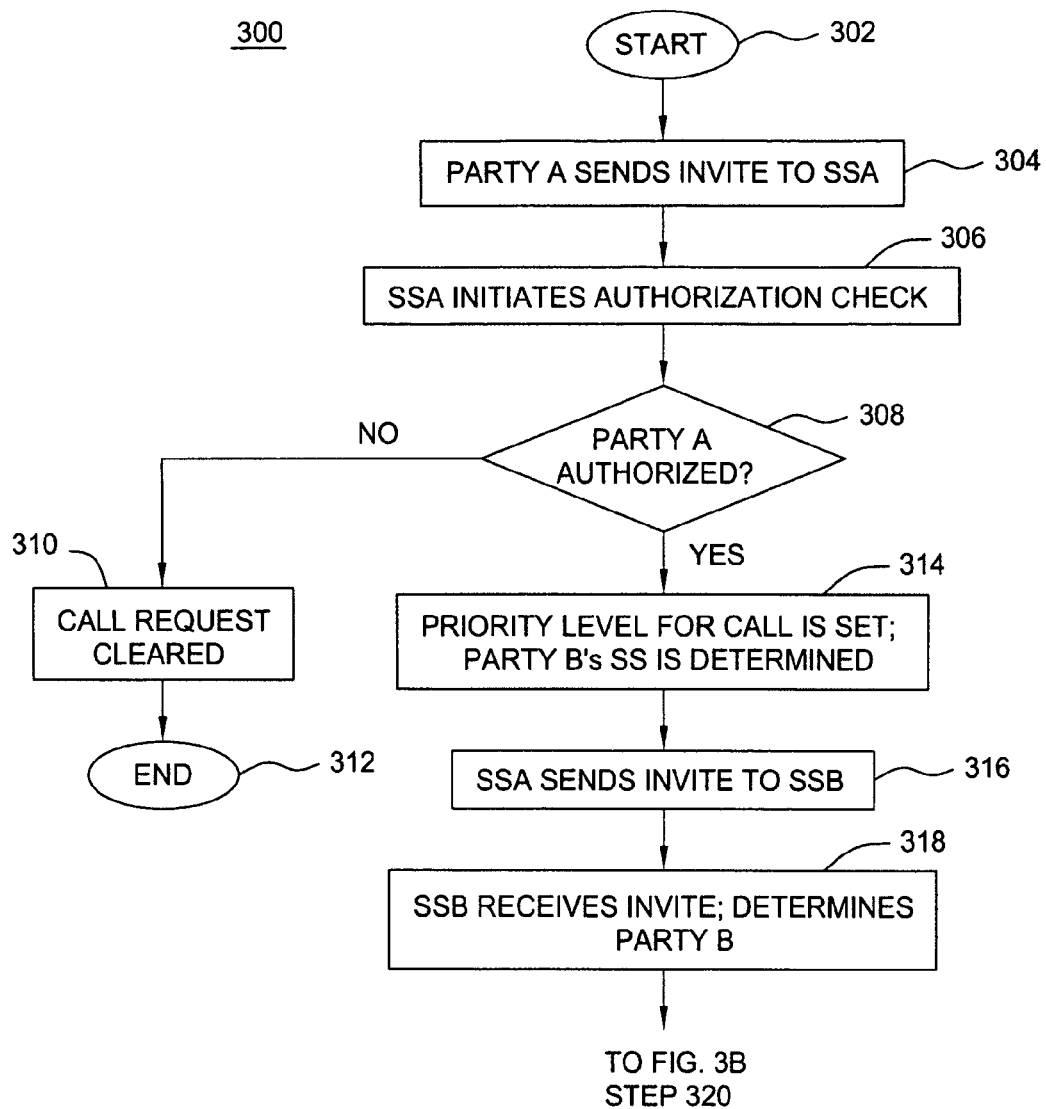
FIG. 3 depicts a series of method steps for processing new voice calls based upon relative priority and network capacity.
Figure 3B:
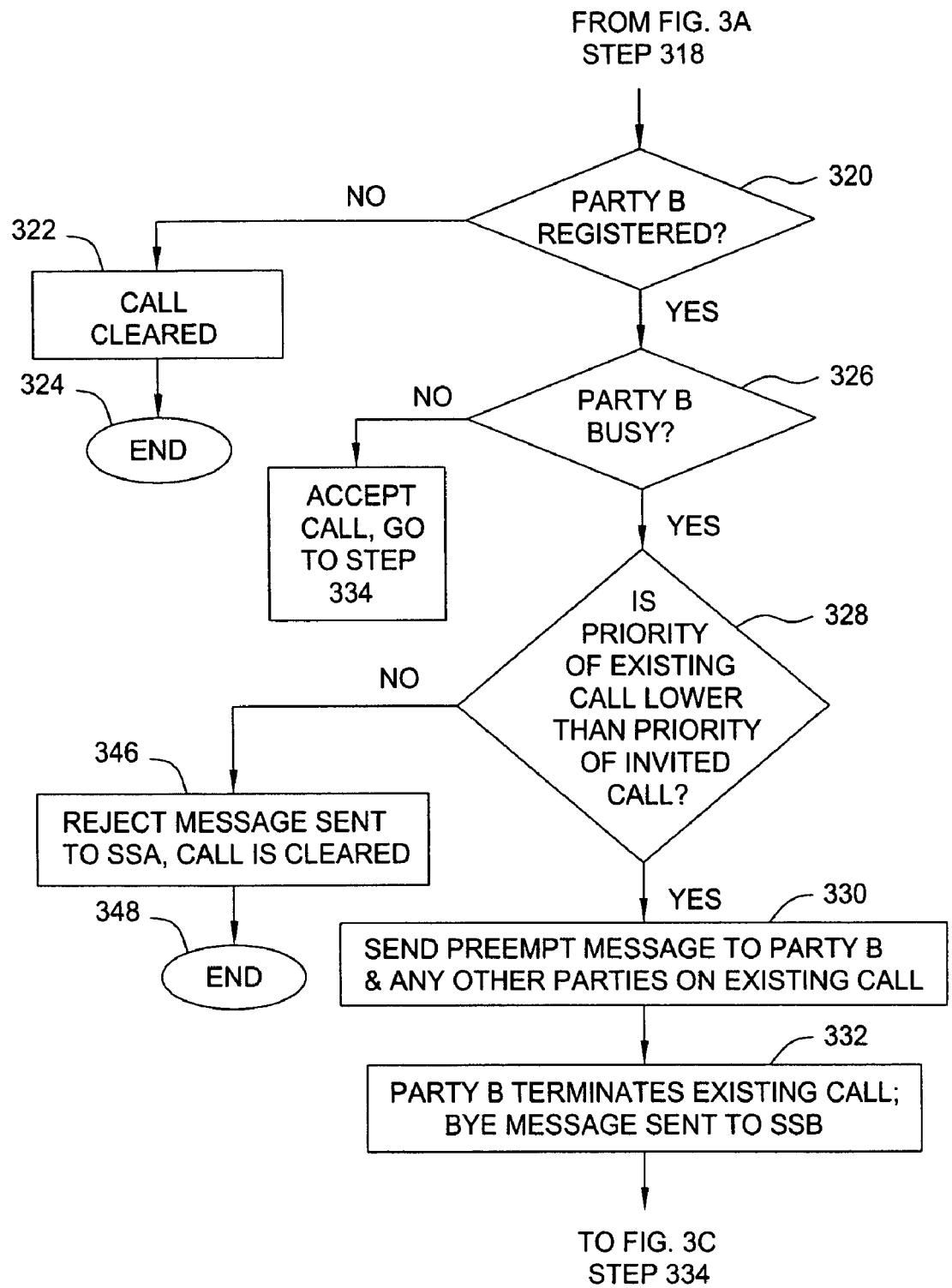
Figure 3C:
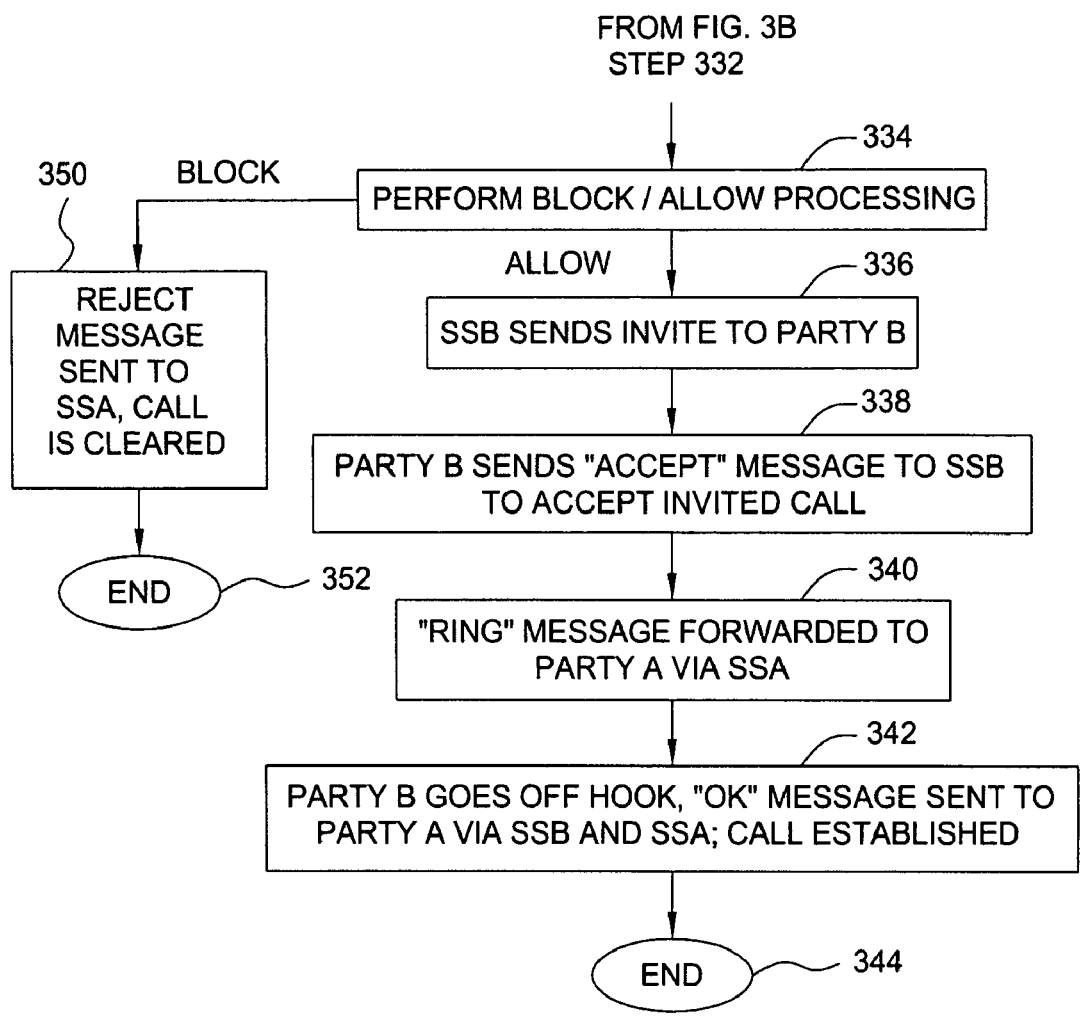

FIG. 3 depicts a call set up signaling scenario between a first Party or Party A (for example, first line subscriber 102 or IP customer 202) and second party or Party B (for example, second line subscriber 104 or IP customer 204) via soft switches 112 in accordance with the CAC algorithm of the subject invention. While the discussed example of call flow is based on SIP protocol, it will be understood by those skilled in the art that other types of protocols can be used in conjunction with the subject invention and achieve the desired results. Examples of such additional protocols are selected from the group consisting of H.248 and H.323.

Specifically, FIG. 3 depicts a flow chart 300 containing a series of method steps for providing new voice call analysis and prioritization in a communication system network. The method 300 starts at step 302 and proceeds to step 304 where Party A sends an invitation message to first softswitch 112$_1$. The SIP invite message includes the dialed digits of Party B. If such new call is to be indicated as a relatively high priority call (as explained in greater detail below), Party A dials a prefix assigned to such higher priority calls as part of the dialed digits or indicate the priority in the message header field. At step 306, first softswitch 112$_1$ initiates an authorization check to determine if Party A is registered on the network and is allowed to originate high priority calls. The specific decision step 308 determines whether Party A has specific authorization to create the high priority call. If it is determined (by, for example, prior data base or preset network profiles) that Party A is not authorized to originate a higher priority call, then the method proceeds to step 310 where the new call request is cleared and the method ends at step 312.

If Party A is authorized to originate a high priority call, the method proceeds to step 314 where the priority level for the new call is set and a search is performed to determine which softswitch in the network has access to Party B. This step is essentially a mapping function that obtains the edge router serving Party B and making the appropriate network interconnections thereto. Once Party B and its attendant softswitch has been located in the network, first softswitch 112$_1$ sends the invitation message including the priority level to second softswitch 112$_2$ at step 316. Second softswitch 112$_2$ forms analysis to determine Party B's identity on the network at step 318. At step 320, a decision step is performed wherein it is determined if Party B is registered on the network or not. If Party B is not registered, the method proceeds to step 322 where the call request is cleared and the method ends at step 324.

Should Party B be registered on the network, the method proceeds to another decision step 326 wherein it is determined if Party B is busy (a call is already existing at Party B's location).

If Party B is not busy, Party B is able to accept the call provided the network can transmit the call without jeopardizing the Quality of Service of other existing calls. Accordingly, the method proceeds to step 334 as described below. If Party B is currently busy, the method checks to see what the relative priorities are of the existing call vs. the new (invited) call. Specifically, at decision step 328, a determination is made to see if the existing call has a lower priority than the invited call. If this condition is false, i.e., the existing call is of higher priority, then the method proceeds to step 346 where a call reject message is sent to softswitch 112$_1$, and both the softswitches 112$_1$ and 112$_2$ proceed to clear the call. The method ends at step 348.

If this condition is true, i.e., Party B is currently busy but the existing call has a lower priority than the new call, the method proceeds to step 330 where the method sends a preemption tone or message to Party B. Should there also be other parties on the existing call to which Party B is interacting with, the preemption message also is sent to those other parties. Upon receiving the preemption message, Party B terminates the existing call by going "on-hook" and generates and sends a "bye" message to second softswitch 112$_2$ at step 332.

At step 334, the path to be used is identified and the current block/allow policy for that path for calls of that priority is executed to determine how the call is to be processed (allowed or blocked as discussed in greater detail below). In this particular description, it is assumed that the new (invited or originated) call is of highest priority and, therefore, is always allowed. Accordingly, the method proceeds to step 336 as discussed below. In situations where the new call is of lower relative priority, there is a possibility that the call may be blocked until such time that the network can handle the incoming call. Should said lower priority call be blocked, the method proceeds to step 348 where a call request is denied and a call reject message is sent to the first softswitch 112$_1$, which then notifies Party A and clears the call. The method subsequently ends at step 352.

Should the lower priority call be allowed, the method proceeds to 336, where second softswitch 112$_2$ sends an invitation message to Party B. The method proceeds to step 338 where Party B receives "ring" message and a call accept message is sent back to softswitch $112_1$ from the second softswitch $112_2$ to accept the invited call. At step 340, the "ring" message is forwarded to Party A via first softswitch $112_1$. Said message includes Party B's IP and transport address, the edge router associated with Party B, and the precedence level of the call. Other types of data may also be included in such message in order to complete the call. At step 342, Party B goes "off-hook" and an OK message is sent to Party A via first and second softswitches $112_1$ and $112_2$. Accordingly, all necessary interconnections are established and the new call proceeds between parties A and B. The method ultimately ends at step 344.

The subject invention is designed for flexibility in that it will work in different types of communication networks such as those described above. If the network in which the subject invention operates is dedicated exclusively for voice traffic, the method proceeds in the manner described above. If the communication network has different types of traffic (i.e., voice traffic and data traffic) traveling along the same communication paths, the invention operates along the service classes reserved for voice traffic to practice the invention. Specifically, in multi-traffic environments, a classification system (for example, DiffServ) is used to separate the voice traffic from the data traffic. Table 1 shown below shows one possible labeling of different DiffServ classes in a multi-traffic network as well as their priority for handling packets (organized data streams within a network) and the bandwidth allocated to each type of traffic. The two types of classes used are identified in the Standards IETF RFC 2998 "A Framework for Integrated Services Operation over Diffserv Networks", Y. Bernet, P. Ford, R. Yavatkar, F. Baker, L. Zhang, M. Speer, R. Braden, B. Davie, J. Wroclawski, E. Felstaine. November, 2000; IETF RFC 3246 "An Expedited Forwarding PHB (Per-Hop Behavior)", B. Davie, A. Charny, J. C. R. Bennet, K. Benson, J.Y. Le Boudec, W. Courtney, S. Davari, V. Firoiu, D. Stiliadis. March 2002; RFC 3260 "New Terminology and Clarifications for Diffserv", D. Grossman. April, 2002; IETF RFC 2597 and IETF RFC 2598 as Assured Forwarding (AF) and Expedited Forwarding (EF) PHB. Those skilled in the art will readily note that the classifications indicated are but one example of how different types of traffic can be assigned to DiffServ classes. Depending on the applications and their requirements in the multi-traffic network, different assignments will best serve in satisfying the QoS requirements.

TABLE 1

| Type of Traffic | DiffServ Class | Relative Priority For Packet Forwarding | Allocated Bandwidth (Example) |
| --- | --- | --- | --- |
| Voice | AF1 | Higher | 75% |
| Data | AF2 | Lower | 20% |
| Signaling | EF (Expedited Forwarding) | Absolute | 5% |

In such a situation where the method is practiced in a multi-traffic environment, the priority levels for the new voice calls are organized as subclasses of the voice traffic class shown in Table 1. Specifically, and in one example of the subject invention, Table 2 shown below shows one example of the different types of classification of different priority level calls as well as the quality of service provided for each class. Specifically, and in one embodiment of the invention, there are five priority levels identified for new voice calls. In order of increasing priority, they are labeled Routine (R), Priority (P), Immediate (I), Flash (F) and Flash Override (FO). Within one particular voice class (and in one embodiment of the invention, a DiffServ class identified as AF1), the two highest priority levels, Flash and Flash Override, are designated as DiffServ subclass AF11. It is possible to include even higher priority classes, say FOO for example in this subclass AF11. Similarly, intermediate voice priority levels, Immediate and Priority, are labeled DiffServ subclass AF12; and lowest priority level, Routine, is labeled as Diffserv subclass AF 13. Those skilled in the art will readily note that the classifications indicated in Table 2 are but one example. Since 4 different AF classes with 3 sub-classes or drop precedence within each class are defined in RFC 2597 Assured Forwarding PHB, priority levels with packet drop treatments can be varied to suit the requirements.

TABLE 2

| Voice Priority Level | DiffServ Class | Packet Drop Treatment |
| --- | --- | --- |
| Flash, Flash Override | AF11 | Don't Drop Packets (until queue is full) |
| Immediate, Priority | AF12 | Medium |
| Routine | AF13 | Most Aggressive |

Since, the Diffserv Standard supports three sub-classes (AF11, AF12, AF 13), the five priority levels in the voice service need to be mapped into these three sub-classes. Note that it is not critical to have a one-to-one mapping at the packet level—three groupings of voice traffic in terms of differentiated packet performance is sufficient. Edge routers (in communication networks so equipped) use DiffServ classification to mark packets with the different priority classes and provide queuing and scheduling treatment for packets according to prioritization.

Calls having the lowest priority of routine receive the most aggressive treatment of packet dropping thereby saving bandwidth for calls of intermediate or higher priority. In one example, packet dropping can start when the buffer is approximately 50% full. Similarly, as the priority level increases to either Immediate or Priority call levels, packet drop treatment is relatively medium (not as aggressive or not as many packets dropped as routine calls). In one example, packet dropping can start when the buffer is approximately 75% full. Finally, in highest level priority calls designated as Flash or Flash Override, packets are not dropped from such calls (unless there is a full buffer condition or other hardware condition that otherwise causes packets to be dropped).

Processing voice calls in a basic network (i.e., without priority level differentiation of calls) is described in co-pending Patent Application Ser. No. 10/951,429 entitled "Method and Apparatus for Management of Voice Over IP Communications" authored by Houck et. al. From that knowledge and the simulation models discussed therein, it is possible to gain insight and subsequently design a call-level control algorithm for multi-level voice calls. In one embodiment of the invention, different decision policies are developed for each priority level, consistent with their blocking objectives. These policies are established based on the discussion above with respect to FIG. 5 and network utilization. For example, in network having five different priority levels for voice calls, the following is an example of a policy used in the DSN:

Flash and Flash Override: Never Block

Immediate: Block 100% of calls when link utilization exceeds 99%

Priority: Block 100% of calls when link utilization exceeds 97%

Routine: Block 20% of calls when utilization exceeds 90%; block 100% of calls when utilization exceeds 95%

An optimal policy for this type of multi-priority voice network can be determined via additional simulation modeling. Furthermore, a network-based CAM implementation enables an easy mechanism to change a control policy via network management. The different thresholds and blocking percentages in the control policy are the variables, which can be changed by a network management system. In fact, this is a desirable feature for government networks, where blocking percentages for different priority calls need to be changed during crisis situations. Therefore, the invention provides for two levels of network and call control. Call level control provides the required IP link bandwidth to meet the blocking objectives for different call types. Packet-level control provides varying packet loss performance by assigning different packet drop priorities to different call types. Accordingly, the invention avoids the need to preempt active calls in the packet network in order to free up bandwidth for admitting higher precedence calls. Instead, it frees up bandwidth in a more graceful and user-friendly manner. During congestion, it lowers the voice quality (increases packet loss) of the lower precedence calls for a short period, while maintaining the quality for the higher precedence calls.

The entire voice traffic (all priorities and paths) share a single queue or buffer in each output port in the core routers. This allows different call types to fully share the IP link bandwidth up to the amount allocated to voice. If there is a surge in the voice traffic, the voice might temporarily "steal" bandwidth from data if available (this is normal within DiffServ classes). If a link starts getting congested, the CAC/CAM algorithms will start blocking new (low priority) calls, thereby, maintaining acceptable QoS for all call types. In addition, if the relative mix of high and low priority voice traffic changes, during crisis for instance, the relative performance (packet loss) of different call types automatically adapts to the changing conditions. This is a very desirable behavior of the single-queue approach that provides a flexible, self-adapting system to changing traffic mix.

Although various embodiments which incorporate the teachings of the present invention have been shown and described in detail herein, those skilled in the art can readily devise many other varied embodiments that still incorporate these teachings.

We claim:

1. A method, comprising the steps of:
   (a) polling at least one location in a network to obtain information indicative of a level of utilization of said at least one location;
   (b) computing a status of utilization of said at least one location based on said polled information and assigning a decision policy to said status;
   (c) assessing a priority level of a new voice call requesting to enter the network relative to priorities of existing calls on the network; and
   (d) invoking said decision policy on the new voice call according to its relative priority level to the existing calls on the network and the decision policy in effect at the time the new voice call requests entry to the network.

2. The method of claim 1 wherein a first party initiating the new voice call is checked for proper authorization to initiate the new voice call.

3. The method of claim 2 wherein a second party receiving the new voice call is checked for proper identification and registration in a network transmitting the new voice call.

4. The method of claim 1 wherein if the priority level of an existing call being entertained by a second party is lower than the priority level of the new voice call being initiated by a first party a preemption message is sent to the second party.

5. The method of claim 4 wherein the second party terminates the existing call and the decision policy is invoked on the new voice call to determine its connection status to the second party.

6. The method of claim 4 wherein if the priority of the existing call is higher than the priority of the new voice call, the new voice call is rejected.

7. The method of claim 1 further comprising after step (a) but before step (b), step (a1) includes polling the network to determine routing paths.

8. The method of claim 7 further comprising after step (a1), determining if a status of variables selected from the group consisting of links and paths have changed since a previous update to assign the policy decision.

9. The method of claim 1 wherein the policy decision includes sub-decisions of never blocking new voice calls having at least a highest relative priority, blocking a first percentage of new voice calls when a system link utilization exceeds a first percentage of system capacity for calls of an intermediate relative priority and blocking a second percentage of new voice calls when link utilization exceeds a second percentage of system capacity for calls of a low relative priority level.

10. The method of claim 9 wherein there are five relative priority levels and the policy decision includes sub-decisions of never blocking new voice calls having highest or second highest relative priority, blocking 100% of new voice calls when the system link utilization exceeds 99% of system capacity for calls of third highest relative priority, blocking 100% of calls when link utilization exceeds 97% of system capacity for calls of a fourth highest relative priority level and selecting a sub-decision from the group consisting of blocking 20% of calls when the system link utilization exceeds 90% of system capacity and blocking 100% of new voice calls when link utilization exceeds 95% of system capacity for a fifth highest relative priority level.

11. The method of claim 1 wherein the decision policy is distributed to one or more call control devices in the network.

12. The method of claim 11 wherein the one or more call control devices are one or more softswitches.

13. The method of claim 1 wherein packets of information that carry the new voice call may be selectively dropped based upon the relative voice call priority level.

14. The method of claim 13 further comprising the step of dropping packets of the lowest relative priority level voice calls when a buffer containing voice call data on the network is at a first percentage of total capacity.

15. The method of claim 14 wherein the first percentage of total buffer capacity is approximately 50%.

16. The method of claim 13 further comprising the step of dropping packets from intermediate priority level calls when a buffer containing voice call data on the network is at a second percentage of total capacity.

17. The method of claim 16 wherein the second percentage of total buffer capacity approximately 75%.

18. The method of claim 13 further comprising the step of dropping packets from the highest relative priority level calls only if a buffer containing voice call data on the network is full.

19. The method of claim 13, wherein packets of information are handed in one class of a multi-class system, said one class having a plurality of sub-classes, each sub-class having a respective packet dropping precedent.

20. The method of claim 19, wherein said one class is AFI and said multi-class system is DiffServ.

21. A computer readable medium containing a program which, when executed, performs an operation of managing voice calls of different types of priority levels, the operation comprising:
   (a) polling at least one location in a network to obtain information indicative of a level of utilization of said at least one location;
   (b) computing a status of utilization of said at least one location based on said polled information and assigning a decision policy to said status;
   (c) assessing a priority level of a new voice call requesting to enter the network relative to priorities of existing calls on the network; and
   (d) invoking said decision policy on the new voice call according to its relative priority level to the existing calls on the network and the decision policy in effect at the time the new voice call requests entry to the network.

* * * * *